Patented Mar. 3, 1953

2,630,382

UNITED STATES PATENT OFFICE 2,630,382

CAST IRON FILLER METAL

Rene David Wasserman, Stamford, Conn.

No Drawing. Application January 15, 1952,
Serial No. 266,609

4 Claims. (Cl. 75—123)

My present invention relates to a cast iron filler metal suitable for use in the welding of cast iron parts. More particularly, it concerns a weld rod composed of a cast iron containing relatively high proportions of silicon and phosphorus, and a small amount of boron.

The usual cast iron contains from about 2 to about 3.5% by weight of carbon present both in solution and in the form of minute graphite flakes. It also contains from about 1.5 to about 4% of silicon and approximately 0.8% of manganese. Small amounts (up to 0.2%) of sulfur and phosphorus may also be present, as well as minor amounts (0.5 to 1.5%) of other metals such as nickel, chromium and molybdenum. In some cases, alloying elements such as nickel, chromium, copper and molybdenum are added in substantial proportions to improve the tensile strength of the alloys.

For welding cast iron parts, particularly cracked castings, it is often preferred to use a cast iron filler metal, in order to produce a homogeneous joint. Various welding processes may be employed, particularly oxy-acetylene welding. A very desirable process is described in my U. S. Patent No. 2,288,869. Unfortunately, the ordinary cast irons are lacking in some of the characteristics, such as fluidity, corrosion resistance, relatively low melting point and density of the weld deposit, desired in the case of a filler metal. Welding rods made of these cast irons are difficult to apply and do not produce strong, permanent bonds.

It is the object of my invention to provide a special type of cast iron that is highly suited for use as a filler metal in the welding of cast iron parts. I have accomplished this object by preparing a cast iron containing relatively high proportions of silicon and phosphorus, and a small amount of boron. My novel cast iron is conveniently applied in the form of a cast rod which may bear a suitable flux coating. It is distinguished by excellent fluidity, corrosion resistance and the formation of dense, non-porous deposits.

The beneficial properties displayed by my cast iron filler metal are most pronounced in the case of cast irons whose compositions are within the following ranges, all percentages given being by weight:

| | Percent |
|---|---|
| Total carbon | 2.5 to 3.5 |
| Manganese | 0.4 to 1.0 |
| Silicon | 4.5 to 5.25 |
| Boron | 0.1 to 0.5 |
| Phosphorus | 0.25 to 0.75 |
| Iron | Balance |

Impurities such as sulfur may be present up to about 0.1%, as well as small amounts of the other usual metals, such as nickel, chromium and molybdenum up to about 1.5%. The optimum properties are developed when the composition is maintained within the following ranges:

| | Percent |
|---|---|
| Total carbon | 2.75 to 3.25 |
| Manganese | 0.4 to 0.6 |
| Silicon | 4.75 to 5.0 |
| Boron | 0.1 to 0.5 |
| Phosphorus | 0.5 to 0.75 |
| Iron | Balance |

I attribute the outstanding properties of my novel cast irons to the combination of relatively high proportions of silicon and phosphorus with the presence of a small amount of boron. Apparently, the boron permits inclusion of the larger than usual amounts of silicon and phosphorus without the detrimental effects that might be anticipated. Regardless of what may be the theoretical explanations, I have established that the cast irons having the compositions given above are outstandingly suitable for use as filler metals in the welding of cast iron products, particularly because of their excellent fluidity and the dense, non-porous deposits obtainable thereby.

My new cast irons generally melt within the range of from about 2225° F. to about 2275° F. Their relatively low melting points are of advantage in the application for welding purposes.

In order to illustrate my invention, the following specific example is given. However, it should be understood that my invention is not limited to the details set forth therein.

Example

A cast iron was prepared having the following composition:

| | Percent |
|---|---|
| Total carbon | 3 |
| Manganese | 0.5 |
| Silicon | 5 |
| Boron | 0.3 |
| Phosphorus | 0.5 |

The molten material was cast in rod form and the rods so produced were employed as filler metal in the process described in my aforesaid Patent No. 2,288,869. The melting point of the rod is approximately 2250° F. A borax containing flux was employed. In this manner a very dense non-porous homogeneous bond between cast iron parts was formed, which bond displayed exceptional strength and resistance to corrosion.

I claim:

1. A cast iron filler metal for welding purposes having the following composition:

|  | Percent by weight |
|---|---|
| Total carbon | 2.5 to 3.5 |
| Manganese | 0.4 to 1.0 |
| Silicon | 4.5 to 5.25 |
| Boron | 0.1 to 0.5 |
| Phosphorus | 0.25 to 0.75 |
| Iron | Balance |

2. A cast iron filler metal for welding purposes having the following composition:

|  | Percent by weight |
|---|---|
| Total carbon | 2.75 to 3.25 |
| Manganese | 0.4 to 0.6 |
| Silicon | 4.75 to 5.0 |
| Boron | 0.1 to 0.5 |
| Phosphorus | 0.5 to 0.75 |
| Iron | Balance |

3. A cast iron filler metal for welding purposes having the following composition:

|  | Percent |
|---|---|
| Total carbon | 3 |
| Manganese | 0.5 |
| Silicon | 5 |
| Boron | 0.3 |
| Phosphorus | 0.5 |

4. A weld rod composed of cast iron having the composition set forth in claim 1.

RENE DAVID WASSERMAN.

REFERENCES CITED

The following references are of record in the file of this patent:

FOREIGN PATENTS

| Number | Country | Date |
|---|---|---|
| 462,284 | Great Britain | Mar. 1, 1937 |